Oct. 27, 1931.   R. H. OLLEY   1,829,054
CONDUIT OUTLET BOX
Filed March 19, 1928
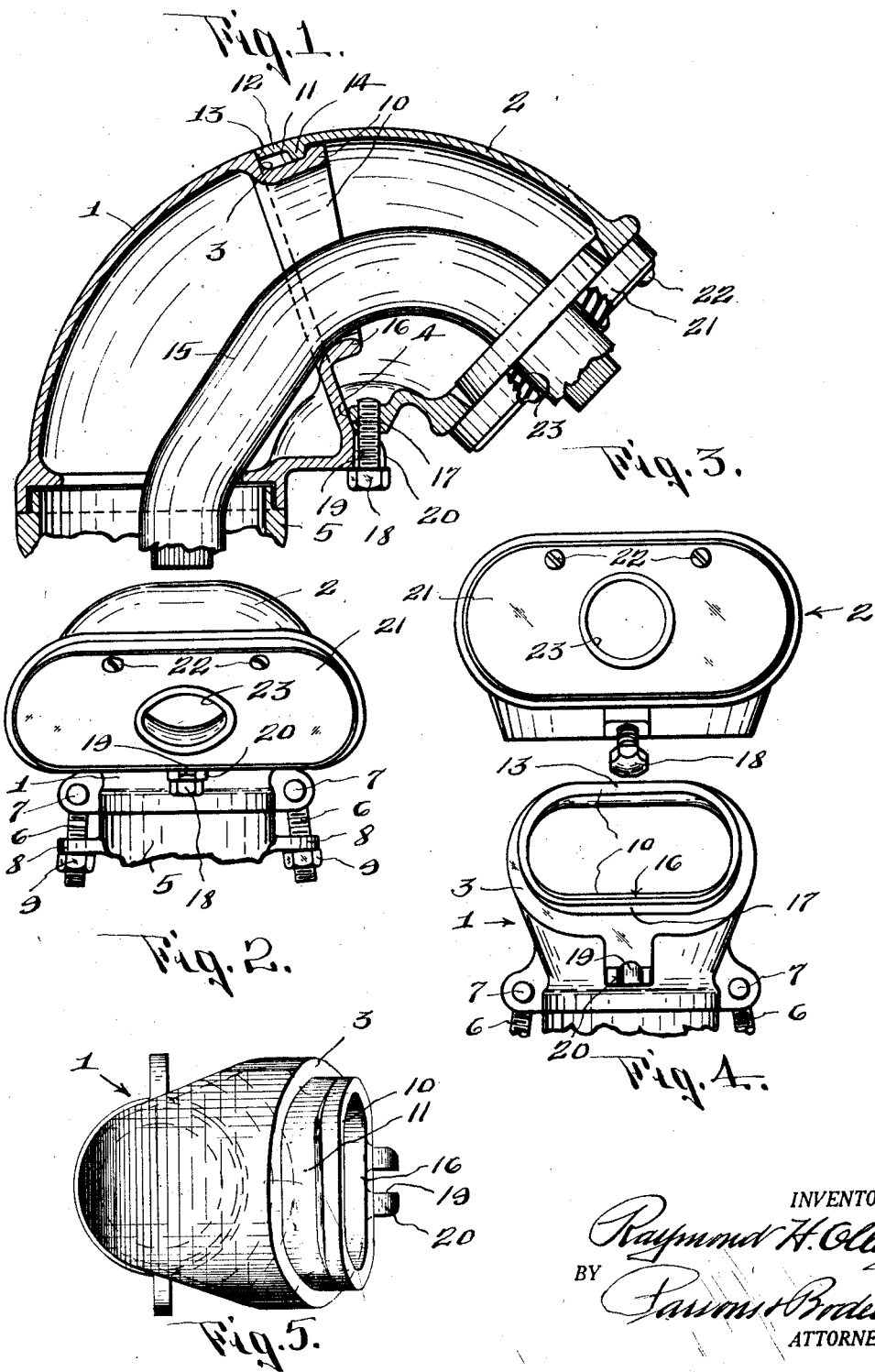
INVENTOR.
Raymond H. Olley.
BY
Parsons & Brodell
ATTORNEYS.

Patented Oct. 27, 1931

1,829,054

UNITED STATES PATENT OFFICE

RAYMOND H. OLLEY, OF SYRACUSE, NEW YORK, ASSIGNOR TO CROUSE-HINDS COMPANY, OF SYRACUSE, NEW YORK, A CORPORATION OF NEW YORK

CONDUIT OUTLET BOX

Application filed March 19, 1928. Serial No. 262,773.

This invention relates to conduit outlet boxes and has for its object a particularly simple means for quickly securing two sections of a box together after the wires or cables have been drawn through the box.

The invention consists in the novel features and constructions and combinations hereinafter set forth and claimed.

In describing this invention reference is had to the accompanying drawings in which like characters designate corresponding parts in all the views.

Figure 1 is a vertical sectional view of a conduit outlet box embodying my invention.

Figure 2 is a front elevation of parts seen in Figure 1 on a reduced scale.

Figure 3 is a face view of the upper part of the box taken at a different angle from that shown in Figure 2.

Figure 4 is a view similar to Figure 3 of the base section of the box, the contiguous portion of the conduit being shown.

Figure 5 is an enlarged plan view of the base portion of the box.

This conduit outlet box comprises generally two sections having marginal abutting end faces inclined to a means for clamping the sections together whereby a relative sliding movement of one section on the other is effected during the closing operation, which movement is angular to the axes of the sections. The box here illustrated is arc shaped and divided into sections along a radial plane.

1 and 2 designates respectively the sections of the box, these having inclined marginal abutting faces 3, 4 which are inclined at an angle to the fastening means 18 hereinafter described. The section 1 is a base section and is mounted upon the end of a conduit 5 and secured thereto in any suitable manner, here shown as by pivot bolts 6 pivoted at 7 to ears on the base section 1 and movable on its pivot into and out of slotted lugs 8 on the conduit 5. Nuts 9 thread on the bolts to tighten them against the lugs and secure the base section 1 to the conduit.

The sections 1 and 2 are provided at one side of the inclined marginal abutting faces which we shall designate as the upper face with reference to the drawings with interfitting wedge means, and at the other side of said faces with clamping means for effecting relative movement of the sections along the inclined faces. As the section 1 is fixed this means moves the section 2 along the inclined face of section 1.

In the illustrated embodiment of my invention, section 1 is provided with a flange 10 formed on the inner edge of the inclined face 3 and extending beyond the same into section 2 (Figures 4 and 5). This flange 10 on its upper side (Figures 1 and 5) is formed with an external recess or inwardly facing channel 11. The section 2 is formed with a flange 12 which laps the flange 11 and abuts at 13 against the inclined end face of the section 1, the flange 12 having a wedge 14 on its inner and upper side for entering the recess 11. This wedge is of less width than the channel and comes into wedging engagement with the wall of the channel at the free end of the flange when the end of the flange 12 abuts at 13 against the inclined face of section 1.

This flange 10 is a continuous closed flange forming a passage for the wire or cable 15. The lower run 16 thereof forms a seat for the cable 15, this part 16 being located between the upper and lower ends of the inclined face 3. The flange 12 is also a continuous closed flange and abuts at its edge against the face 3, the lower portion thereof abutting against the lower end of the inclined face 3 at 17.

The means for effecting the relative sliding movement of the sections 1, 2 is preferably located opposite the coacting wedge 14 and channel 11 and is here shown as a screw bolt 18 extending through an open slot 19 provided in a lug 20 on the section 1 at the lower side of the flange 12 on section 2, the screw 18 extending at an angle to the section.

The sections are here shown as arc shaped and the abutting faces 3, 4 and flanges 10, 12 are in the form of an oblong with rounded ends and the inclined faces extend radially relatively to the arc of the sections.

The coacting wedge means is located at the outer end or edge of the radial inclined faces 3, 4 and the clamping means or screw 18 at the inner or lower edge of the radial inclined abutting faces.

The outer end of the section 2 is closed by a suitable closure of insulation 21 held in position by screws 22, this closure being formed with an opening 23 through which the cable 15 extends.

In operation, after the cable has been pulled through the section 1 and passed through the section 2 which has not yet been attached to the section 1, the section 2 is brought up against the section 1 with the wedge 14 in the channel 11 and with the sections abutting together at 13. The screw 18 is then tightened moving the section 2 downwardly along the inclined face 3 and bringing the wedge 14 into engagement with the coacting surface of the channel 10 thus clamping the sections together. During this operation, the screw slides the section 2 along the section 1 and the wedge means thrusts the section 2 tightly against the section 1.

What I claim is:

1. A conduit outlet box comprising sections abutting end to end and means for joining the sections together, including a clamping member extending at an angle to the planes of the abutting faces, wedge means carried by the sections whereby upon operation of the clamping member, the sections are caused to slide one upon the other and lock the wedge means to secure the sections together.

2. A conduit outlet box comprising two sections abutting end to end, the sections having marginal abutting faces, one section having a notch in one side of the abutting face and the other section having a wedge for entering the notch and means for joining the sections together consisting of a clamping member located on the sides of the abutting faces opposite to the notch and wedge and extending at an inclined angle to the planes of the abutting faces, whereby one section is caused to move along the other to bring the wedge and the notch into interfitting relation and thereby clamping the sections together.

3. A sectional conduit outlet box, the sections abutting end to end along marginal abutting faces, one section having a flange extending into the other section and the other section having a flange overlapping the former flange, the flanges having a coacting wedge and wedge recess and means for effecting an angular sliding movement between the sections for bringing the wedge in the wedge recess into interfitting relation and thereby clamping the sections together.

4. A sectional conduit outlet box, the sections abutting end to end along marginal abutting faces, one section having a flange extending into the other section and the other section having a flange overlapping the former flange, the flanges having a coacting wedge and wedge recess and means for effecting an angular sliding movement between the sections for bringing the wedge in the wedge recess into interfitting relation and thereby clamping the sections together, the clamping means consisting of a clamping member located at the sides of the marginal abutting faces opposite the wedge and wedge recess.

5. A conduit outlet box comprising two angular sections abutting together end to end, one section being formed with a flange projecting from the marginal abutting face of said section and extending into the other section, said flange being formed with a channel, the other section having a marginal flange with a wedge for entering the channel on the former flange and engaging the wall of the channel remote from the marginal abutting face of the first section when the second flange is in abutting relation with the first section and means for effecting a relative angular movement of the sections along the abutting faces, said means being located at the side of the abutting faces opposite the channel and the wedge.

6. A conduit outlet box comprising two sections abutting end to end along marginal abutting faces, one section having a flange projecting from the marginal abutting faces and extending into the other section, said flange being formed with an external channel located at one end of the abutting face and the other section being formed with a flange lapping the former flange and abutting at its end against the margin of the abutting face of the first section and having an internal rib to coact with the channel on the former flange and clamping means located at the opposite side of the abutting faces for effecting a relative angular movement along the marginal abutting faces, the last mentioned means comprising a screw associated with one section and threading into the other at an inclined angle to the plane of the abutting faces.

In testimony whereof, I have hereunto signed my name, at Syracuse, in the county of Onondaga, and in the State of New York, this 8th day of March, 1928.

RAYMOND H. OLLEY.